(12) United States Patent
Sellinger et al.

(10) Patent No.: US 11,370,402 B2
(45) Date of Patent: Jun. 28, 2022

(54) BRAKING DEVICE FOR A HYDRAULIC MOTOR VEHICLE BRAKING SYSTEM COMPRISING A STOP DISC

(71) Applicant: Continental Teves AG & Co. oHG, Frankfurt am Main (DE)

(72) Inventors: Thomas Sellinger, Frankfurt am Main (DE); Christian Rene Koch, Frankfurt am Main (DE); Jefferson Colasanta, Frankfurt am Main (DE); Peter Drott, Frankfurt am Main (DE)

(73) Assignee: Continental Teves AG & Co. oHG

( * ) Notice: Subject to any disclaimer, the term of this patent is extended or adjusted under 35 U.S.C. 154(b) by 199 days.

(21) Appl. No.: 16/756,676

(22) PCT Filed: Jun. 21, 2018

(86) PCT No.: PCT/EP2018/066530
§ 371 (c)(1),
(2) Date: Apr. 16, 2020

(87) PCT Pub. No.: WO2019/076491
PCT Pub. Date: Apr. 25, 2019

(65) Prior Publication Data
US 2020/0282967 A1 Sep. 10, 2020

(30) Foreign Application Priority Data

Oct. 20, 2017 (DE) ...................... 10 2017 218 768.9

(51) Int. Cl.
*B60T 11/18* (2006.01)
*B60T 13/12* (2006.01)

(52) U.S. Cl.
CPC ............... *B60T 11/18* (2013.01); *B60T 13/12* (2013.01); *B60Y 2306/09* (2013.01)

(58) Field of Classification Search
CPC ........... B60T 13/12; B60T 11/18; B60T 11/16
See application file for complete search history.

(56) References Cited

U.S. PATENT DOCUMENTS 6,550,246 B2 4/2003 Barr et al.
6,584,771 B2 7/2003 Keller et al.
(Continued)

FOREIGN PATENT DOCUMENTS

CN 10812905 A 8/2006
CN 101795911 A 8/2010
(Continued)

OTHER PUBLICATIONS

International Search Report and Written Opinion for International Application No. PCT/EP2018/066530, dated Sep. 12, 2018, 8 pages.
(Continued)

*Primary Examiner* — Michael Leslie
*Assistant Examiner* — Daniel S Collins
(74) *Attorney, Agent, or Firm* — RatnerPrestia

(57) ABSTRACT

In order to offer an improved brake device without vacuum booster, in the case of which brake device the zero point of the cylinder piston remains as far as possible permanently within defined narrow tolerances and at the same time the impact noise is reliably reduced, it is proposed that the stop disk is elastically reversibly compressible in an axial direction over a defined compression travel and has the compression travel delimited, the delimitation being defined in a travel-controlled manner.

9 Claims, 4 Drawing Sheets

(56) References Cited

U.S. PATENT DOCUMENTS

| | | |
|---|---|---|
| 6,775,979 B1 * | 8/2004 | Drott .................. B60T 8/38 60/588 |
| 7,267,040 B2 | 9/2007 | Attard et al. |
| 7,963,210 B2 | 6/2011 | Lanquetot et al. |
| 8,925,698 B2 | 1/2015 | Herges et al. |
| 9,180,851 B2 | 11/2015 | Loke et al. |
| 2014/0150420 A1 | 6/2014 | König et al. |

FOREIGN PATENT DOCUMENTS

| | | | |
|---|---|---|---|
| CN | 102177058 A | 9/2011 | |
| DE | 19610834 C1 | 6/1997 | |
| DE | 19615157 A1 | 10/1997 | |
| DE | 10028673 A1 | 12/2001 | |
| DE | 102010022106 A1 | 12/2010 | |
| DE | 102015201311 A1 | 8/2015 | |
| JP | 2015-96358 * | 11/2013 | ............. B60T 11/16 |
| KR | 102056581 B1 | 12/2019 | |
| WO | 2011012431 A2 | 2/2011 | |

OTHER PUBLICATIONS

Chinese Office Action for Chinese Application No. 201880068003.5, dated Nov. 18, 2021 with translation, 17 pages.

\* cited by examiner

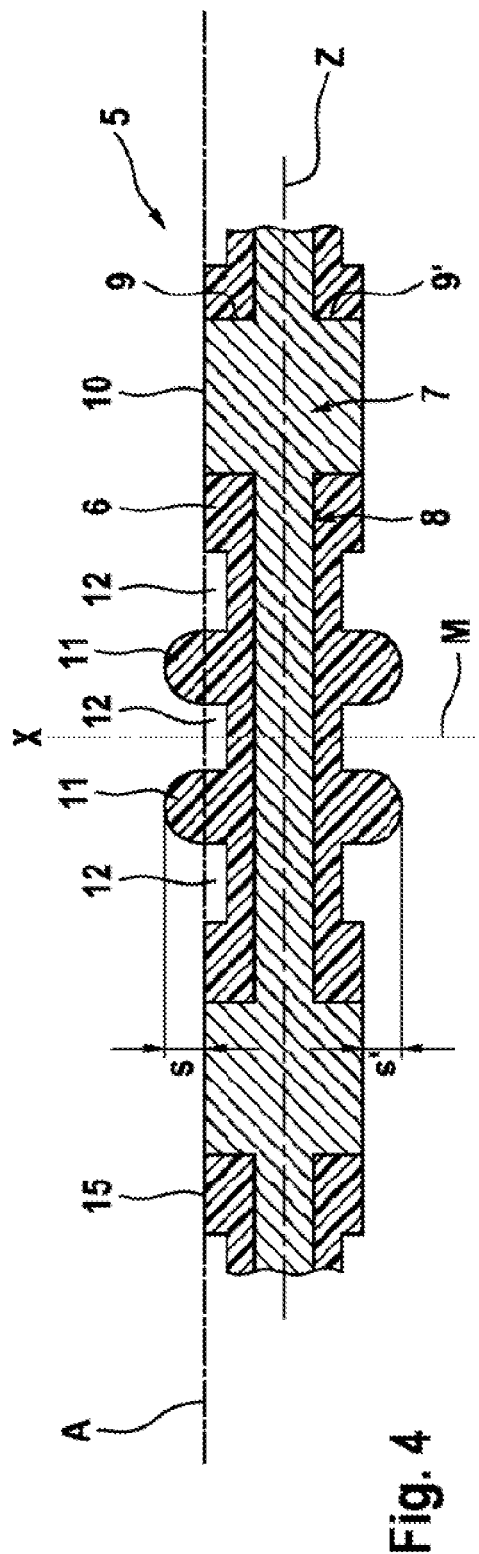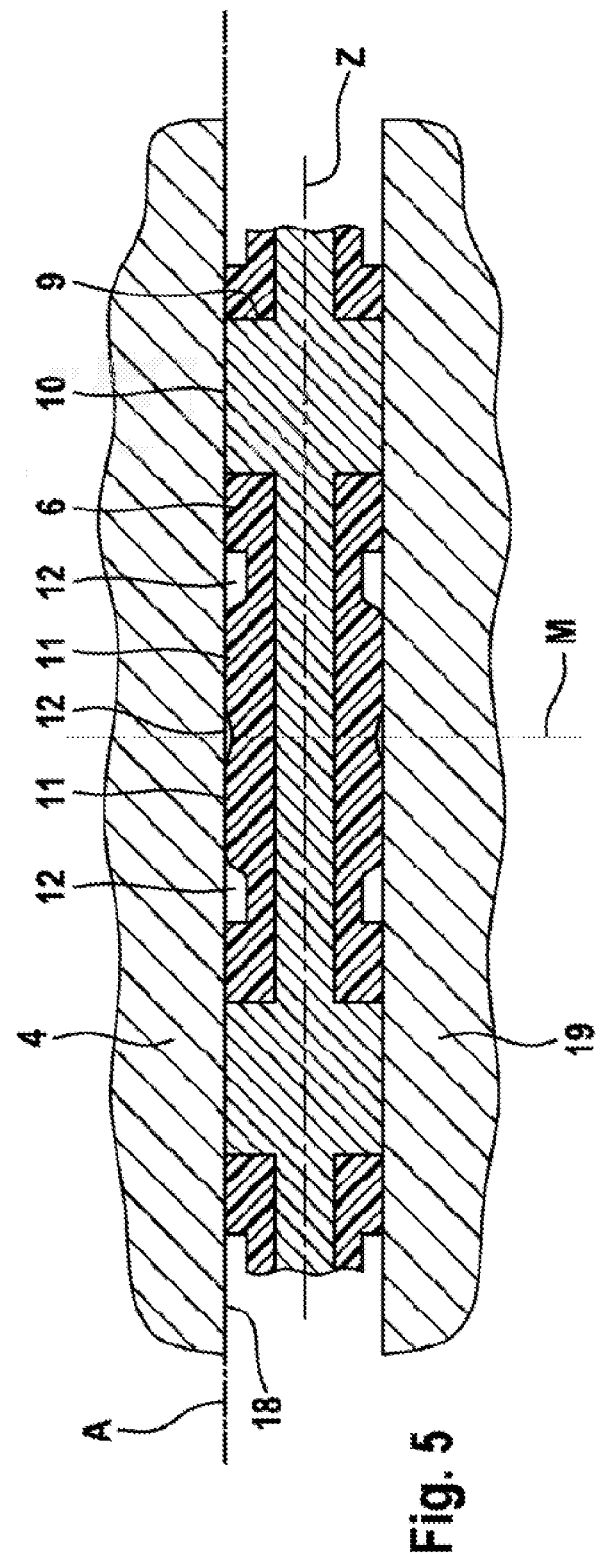

BRAKING DEVICE FOR A HYDRAULIC MOTOR VEHICLE BRAKING SYSTEM COMPRISING A STOP DISC

CROSS REFERENCE TO RELATED APPLICATIONS

This application is the U.S. National Phase Application of PCT International Application No. PCT/EP2018/066530, filed Jun. 21, 2018, which claims priority to German Patent Application No. 10 2017 218 768.9, filed Oct. 20, 2017, the contents of such applications being incorporated by reference herein.

FIELD OF THE INVENTION

The invention relates to a brake device for a hydraulic motor vehicle brake system.

BACKGROUND OF THE INVENTION

Owing to increasing automation of vehicle control systems including braking control systems, but also the desire to save installation space, externally actuatable brake devices with significantly smaller electrohydraulic, electromechanical and other such booster stages are becoming increasingly widely used.

For reliable actuation, calibration and travel detection of the driver demand, externally actuatable brake devices require knowledge of the precise relative position of a cylinder piston, which builds up the brake pressure, in its non-actuated initial position, known as the zero or reference point. In order to avoid the cost of complex sensor systems and physical calibration, it is known to provide a positionally fixed mechanical stop for the cylinder piston, which stop defines said zero point and serves as a measurement origin for the electronic control systems.

In comparison with a conventional brake device, however, devices without a vacuum booster have less inherent damping owing to the design concept. This means that, for example in the event of rapid release of the brake pedal after braking, the cylinder piston and solid mechanical actuation components coupled thereto, such as for example the actuation rod and brake pedal, have too high a return speed, whereby an impact noise is generated when they strike the mechanical stop, which impact noise can be perceived as irritating.

One generally known basic method, using a rubber disk for impact dampening, is unsuitable in the present case because, owing to the high elasticity, it is not possible to maintain the zero point within the required narrow tolerance.

It is therefore known from practice to use a stop disk composed of a thermoplastic material, in particular polyether ether ketone (PEEK), as a direct stop for the cylinder piston. The damping action of such a disk is however often considered to be too little, and in need of improvement. Furthermore, such disks have the tendency to deform in the long term, such that the zero point shifts over time and necessitates cumbersome calibration measures.

SUMMARY OF THE INVENTION

An aspect of the invention is an improved brake device without vacuum booster, in the case of which brake device it is made possible for the zero point of the cylinder piston to remain as far as possible permanently within defined tolerances, and at the same time the impact noise is reliably reduced.

An aspect of the invention provides that the stop disk is elastically reversibly compressible in an axial direction over a defined compression travel and has means for delimiting the compression travel, said delimitation being defined in a travel-controlled manner.

In this way, the required damping of the noise is achieved, and at the same time a zero point of the cylinder piston which remains permanently within narrow tolerances is ensured.

In one refinement of an aspect of the invention, the stop disk has an elastomer casing and a core which is at least partially encased by the casing. The casing may preferably be produced from an inexpensive EPDM polymer, which is resistant to brake fluid, by encapsulation of the core by injection molding, and the core may be composed of a significantly more rigid material such as metal or fiber-reinforced plastic. By means of this combination, the advantageous combination between permanently available impact damping together with a consistent zero point can be realized in a particularly inexpensive and easily adaptable manner. Here, the material for the casing is configured such that adequate damping is simultaneously obtained, and at the same time the resetting force provided is sufficient to produce the contact between the cylinder piston and the core of the stop disk.

Furthermore, the stop disk according to an aspect of the invention has a stop plane which is orthogonal with respect to the center axis and against which the cylinder piston bears in its non-actuated initial position, wherein the core has multiple elevations which are extended forward axially as far as the stop plane A and which are arranged spaced apart from one another in the circumferential direction. Here, the elevations preferably form plateaus, the axial end surfaces of which are arranged in the stop plane and are not covered by the material of the casing.

After compression of the casing, the cylinder piston impacts against the contact surface points thus defined, and thus arrives in a defined end position.

A reliable wear-free and deformation-free stop facility for the cylinder piston is thus realized, and the stop disk designed according to an aspect of the invention can be easily used in exchange for the known series stop disks.

In the further preferred refinement, the casing has, in a region between two adjacent elevations in the circumferential direction, protuberances and depressions which are arranged adjacent to one another in an alternating manner; axially in relation to the stop plane, the protuberances are higher and the depressions are analogously lower. In this way, the material in the protuberances is, during the compression thereof, displaced in an effective manner into the depressions, and reliable setting-down of the cylinder piston on the core of the stop disk is ensured.

Here, the protuberances are preferably formed in the manner of ribs extending in a radial direction over the face side of the stop disk. In this way, the cylinder piston can be of particularly thin-walled design, which saves weight and material, and its axial positioning tolerances in the cylinder bore can be reliably compensated.

In a further advantageous embodiment, on the casing, there are provided multiple radial projections which are extended forward in the radial direction and by means of which a secure seat in the cylinder bore by means of a slight oversize, and easy installation of the stop disk in the housing, are ensured.

In one particularly preferred embodiment of the invention, the stop disk is of plane-symmetrical construction in relation to a central plane, whereby said stop disk has a uniform action on both sides and no distinction between sides has to be observed during the installation process.

An aspect of the invention furthermore provides a support projection, in particular an encircling collar, which projects from the housing radially into the cylinder bore and which ensures a reliable introduction of force from the cylinder piston into the housing, and a stable zero point.

BRIEF DESCRIPTION OF THE DRAWINGS

Further features and advantages of aspects of the invention will emerge from the following description of an exemplary embodiment according to an aspect of the invention. In the appended drawings:

FIG. 4 shows, in a detail, a simplified side view of the stop disk as per FIGS. 3A and 3B in a sectional illustration in the unloaded state.

FIG. 5 shows the view as per FIG. 4, but in the assembled state, in the non-actuated initial position with the abutting cylinder piston.

DETAILED DESCRIPTION OF THE PREFERRED EMBODIMENTS

FIG. 1

Figure 1:
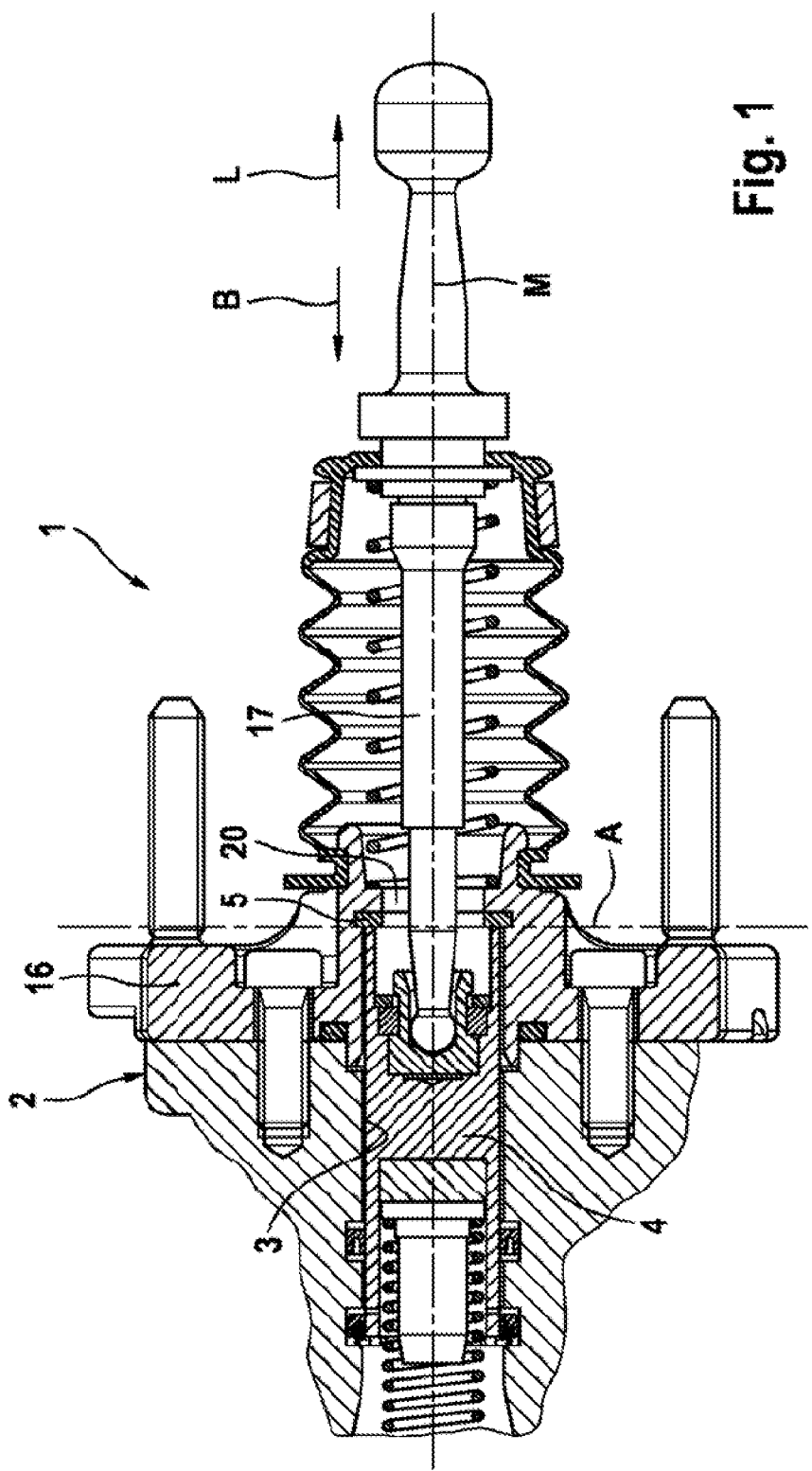
FIG. 1 shows a simplified detail view of a brake device according to an aspect of the invention in longitudinal section.

The brake device 1 according to an aspect of the invention has a multi-part housing 2 in which there is arranged a cylinder bore 3 with a center axis M for receiving a cylinder piston 4. The cylinder piston 4 is arranged in the cylinder bore 3 so as to be linearly displaceable along the center axis M in an actuation direction B by an actuation element 17 during a braking operation and, after the braking operation, oppositely in a release direction L by spring force. The actuation element 17 is led from the outside through an axial aperture 20 into the housing 2 and, therein, into the cylinder piston 4. A support projection 19 formed on the housing 2 projects radially inward into the cylinder bore 3. A stop disk 5 is clamped between the support projection 19 and the cylinder piston 4. In the embodiment illustrated, the support projection 19 is designed as an encircling collar formed on a housing cover 16 of the multi-part housing 2. Other functionally equivalent designs of the support projection are self-evidently admissible within an aspect of the invention.

In the illustrated, non-actuated initial position, the cylinder piston 4 has abutted with its rear stop surface 18 in a stop plane A against the stop disk 5 which, here, delimits the further movement of said cylinder piston in the release direction L. The stop plane A references the zero point of the cylinder piston 4 in its non-actuated initial position.

Figure 2:
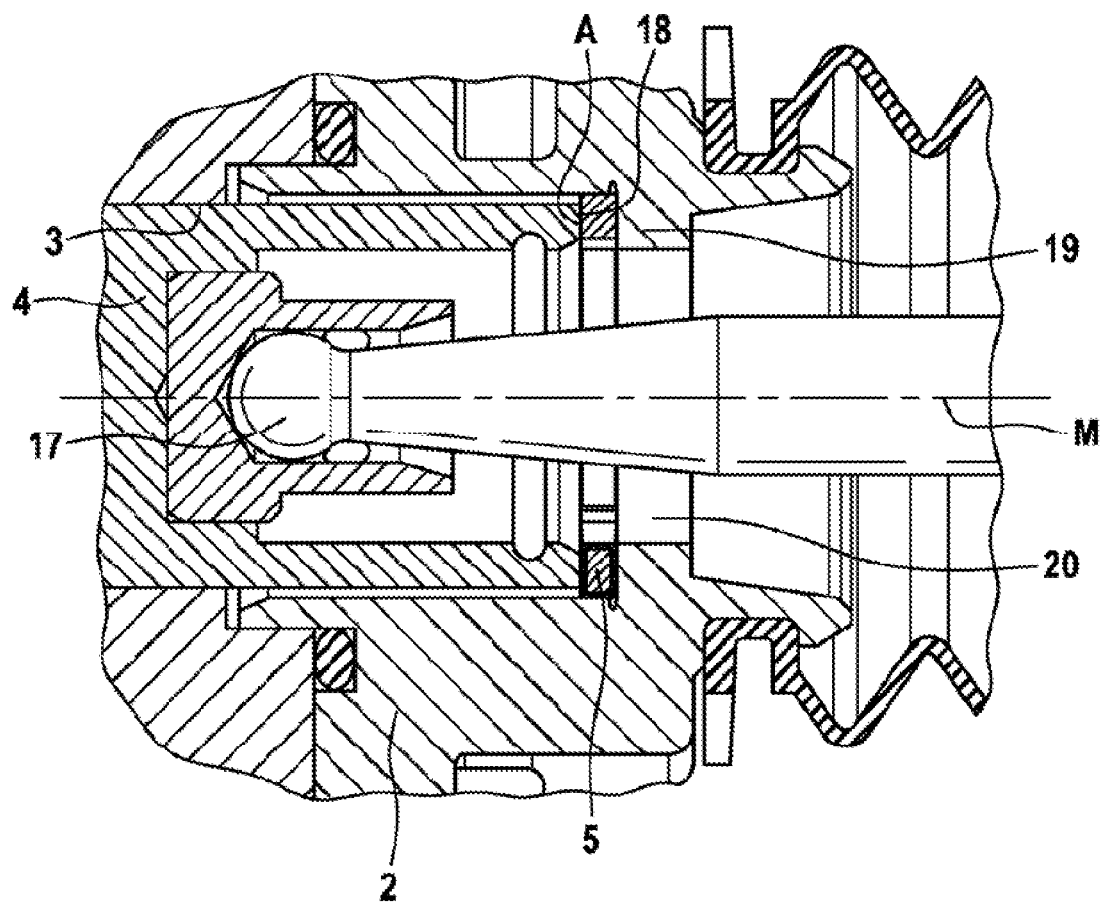
FIG. 2 shows an enlarged view of a region of the embodiment as per FIG. 1 with the stop disk.

FIG. 2 shows an enlarged illustration for clarifying the above-described positioning of the cylinder piston 4 at the zero point and of the relevant components.

Figure 3B:
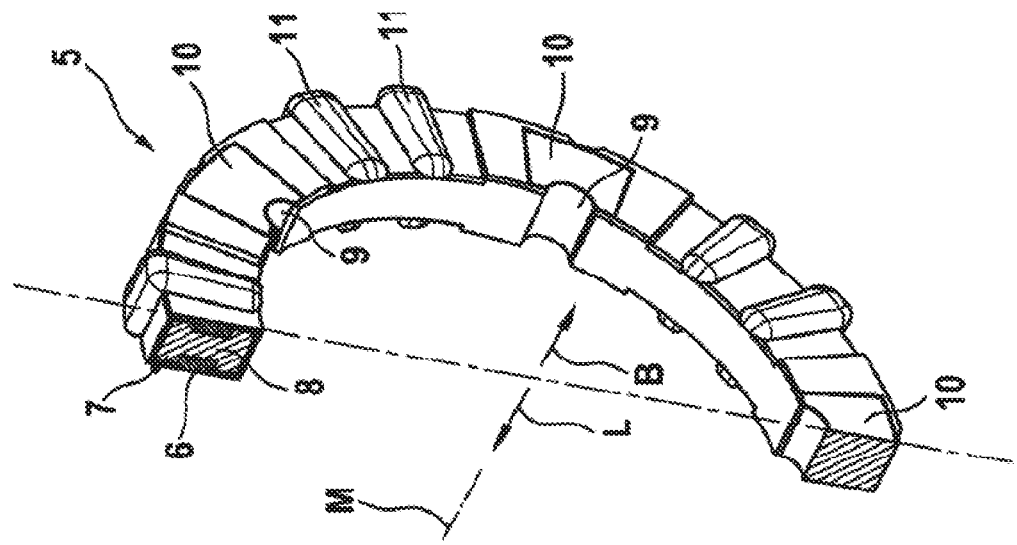
FIGS. 3A and 3B show a three-dimensional view of an embodiment according to an aspect of the invention of the stop disk in its entirety (3A) and in section along the center axis (3B).
Figure 3A:
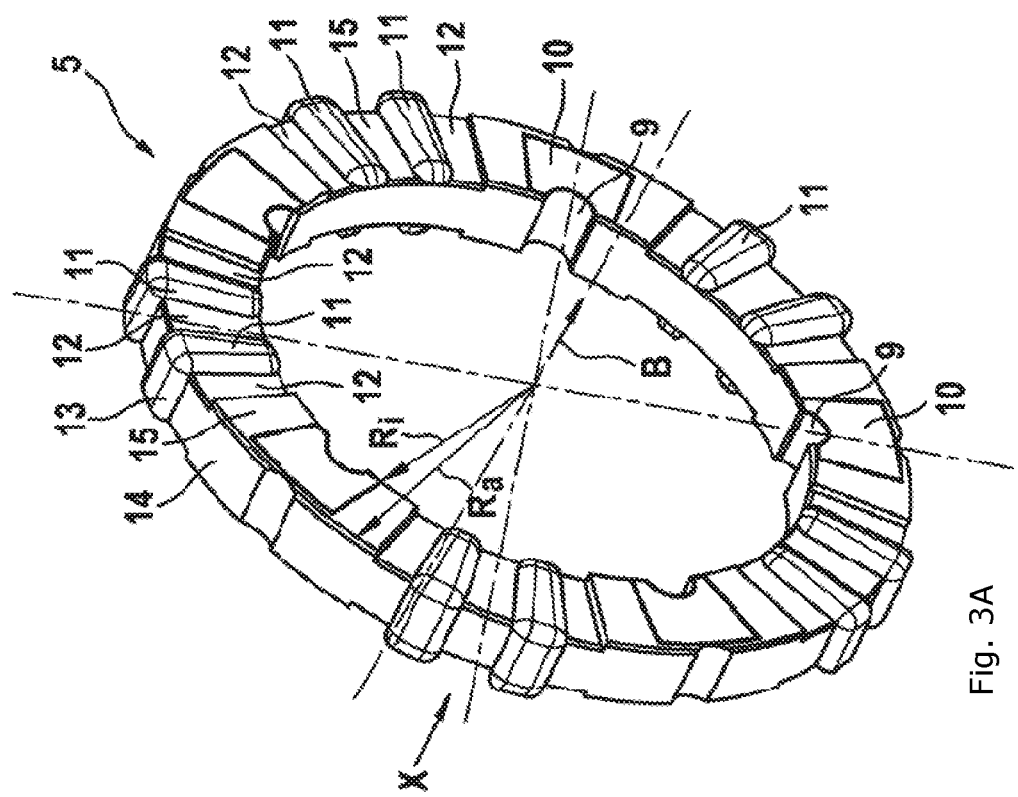

FIGS. 3A and 3B

FIGS. 3A and 3B show a preferred embodiment according to an aspect of the invention of the stop disk 5 in a three-dimensional illustration.

Achievement of the zero position of the piston is ensured.

The illustrated stop disk 5 is composed of two different materials in a material combination. It comprises a hard, relatively wear-resistant core 7, and a soft, elastic casing 6 which has a damping action and which encases the core 7 virtually completely.

The core 7 is preferably composed of a metal, in particular an aluminum alloy, and the casing is produced from an elastomer, in particular a terpolymer such as EPDM polymer. The Shore hardness of the elastomer is in this case selected in a manner dependent on operating factors such that, for the specific usage situation, an as far as possible optimum balance between damping and elasticity is realized.

Within an aspect of the invention, it is however also possible for the core to be formed from other relatively rigid and wear-resistant materials, for example fiber-reinforced thermoplastics or thermosets.

In the preferred embodiment illustrated, the stop disk 5 is of plane-symmetrical form in relation to an orthogonal central plane Z. Therefore, the following statements apply equally to both axial directions proceeding from the central plane Z and orthogonally with respect thereto, as will become clear in particular from FIGS. 4 and 5.

The core 7 in the preferred embodiment illustrated has a relatively narrow ring-shaped main body 8 and multiple elevations 9 extending forward axially as far as the stop plane A, which elevations ultimately function as a relatively incompressible stop element for the cylinder piston 4 and the support projection 19 and substantially close the force flow between the cylinder piston 4 and the housing 2. Within an aspect of the invention, the number of elevations may vary as required depending on loading and circumferential length. Preferably, however, for three-dimensionally stable abutment, the elevations 9 should be arranged in an uniformly distributed manner over the circumference, and at least three elevations 9 should be provided. In the embodiment illustrated, there are five elevations 9 arranged uniformly spaced apart from one another in the circumferential direction.

The elevations 9 form flat plateaus 10 which are not covered by the casing 6, and the axial end surfaces of which are arranged in the stop plane A. Further, for example dome-shaped, conical, pyramid-shaped and other similar designs of the elevations 9 with endpoints instead of end surfaces in the stop plane A are however also admissible within an aspect of the invention.

In a region between two elevations 9 in the circumferential direction, the elastic casing 6 alternately forms depressions 12 and protuberances 11. It is self-evident that the protuberances 9 are each extended forward above the stop plane A, and the depressions 12 are recessed below the stop plane A. Each protuberance 11 is preferably directly flanked on both sides in the circumferential direction by in each case one depression 12.

A protuberance 11 is formed as a type of rib, and the depression is formed as a type of groove, on the face side 15 of the stop disk 5, which face side extends in the radial direction between a radial inner dimension Ri and a radial outer dimension Ra. In the example shown, said protuberance and depression run in radiating fashion across the entire face side 15. It is also conceivable within an aspect of the invention for the inner dimension Ri to be not equal to the inner radius of the stop disk 5 but larger, and/or for the outer dimension Ra to be smaller than the outer radius of the stop disk 5, or for the protuberances to be formed not in a straight radiating manner but rather so as to be inclined in a circumferential direction or of some other curved or coiled form.

The casing 6 furthermore has multiple radial projections 13 which, in the embodiment shown, are arranged as axial continuations of the rib-like protuberances 11 and basically, at uniform intervals in the circumferential direction, so as to be extended forward in the radial direction beyond the radial outer side 14 of the stop disk 5. Here, the diameter of the radial outer side 14 is selected to be equal to or slightly smaller than the diameter of the cylinder bore 3, and the maximum radial extent of the radial projections 13 is selected to be slightly larger.

Within an aspect of the invention, the number of protuberances 11, depressions 12 and radial projections 13 may vary, and, in each specific embodiment, is dependent on the present operating requirements such as, for example, diameter of the cylinder bore 3, operating loads, materials used, design of the stop surface 18, required degree of damping, and similar factors. In the embodiment illustrated, by way of example, in each case two protuberances 11 and in each case three depressions 12 are situated between two elevations 9.

FIG. 4

FIG. 4 shows, in simplified form, a detail of the stop disk 3 in the view "X" as per FIGS. 3A and 3B, in a sectional illustration in the unloaded state.

In addition to the details described above, it is clear that the protuberances 11 have a first projecting length s above the stop plane A or the plateau 10 at the cylinder piston side and have a second projecting length s' at the support projection side, said projecting lengths being equal in the plane-symmetrical embodiment shown.

In a loaded state in accordance with the non-actuated initial position as per FIG. 1, the casing 6 is compressed axially exactly by the sum of the two projecting lengths s and s'. The sum of the two projecting lengths s and s' thus forms the compression travel S of the stop disk 5.

FIG. 5

This loading state is illustrated in FIG. 5. During the return movement in the release direction L, the cylinder piston 4, by way of its rear stop surface 18, firstly strikes the protuberances 11, and simultaneously pushes the stop disk 5 in the direction of the support projection 19. The protuberances 11 deform, generating an opposing force, and in so doing absorb a part of the kinetic energy of the cylinder piston 4. The cylinder piston 4 is thus braked over the entire compression travel S. At the end of the compression travel S, the braked cylinder piston 4 and the support projection 19 impact in damped fashion against the rigid elevations 9 of the core 7, whereby the compression travel S is delimited, said delimitation being defined in a travel-controlled manner by the construction. In the resulting non-actuated initial position, the stop disk 5 is clamped between the cylinder piston 4 and the support projection 19 and the force flow between the cylinder piston 4 and the housing 2 runs directly through the hard, non-compressible core 7 of the stop disk 5.

During the compression, the material in the protuberances 11 is displaced into the adjacent depressions 12, whereby it is ensured that, in the non-actuated initial position, the elastic casing 6 is situated axially entirely between the planes delimited by the protuberances 9 and the core 7, while being in simultaneous contact with the cylinder piston 4 and the housing 2.

In the event of a displacement of the cylinder piston 4 in the actuation direction B, the stop disk 5 returns into its unloaded state as per FIG. 4.

REFERENCE DESIGNATIONS

1 Brake device
2 Housing
3 Cylinder bore
4 Cylinder piston
5 Stop disk
6 Casing
7 Core
8 Main body
9 Elevation
10 Plateau
11 Protuberance
12 Depressions
13 Radial projections
14 Outer side
15 Face side
16 Housing cover
17 Actuation element
18 Stop surface
19 Support projection
20 Aperture
A Stop plane
B Actuation direction
L Release direction
M Center axis
S Compression travel
Z Central plane
Ri Radial inner dimension
Ra Radial outer dimension

The invention claimed is:

1. A brake device for a hydraulic motor vehicle brake system without vacuum booster, comprising:
   a housing with at least one cylinder bore in which a cylinder piston is guided so as to be linearly displaceable along a center axis in an actuation direction and in a release direction directed oppositely to the actuation direction; and
   a stop disk which delimits movement of the cylinder piston in the release direction and thus defines a non-actuated initial position of said cylinder piston,
   wherein the stop disk is elastically reversibly compressible in an axial direction over a defined compression travel and delimits the compression travel, said delimitation being defined in a travel-controlled manner,
   wherein the stop disk has an elastomer casing and a core which is at least partially encased by the casing, wherein the core is constructed from a more rigid material in relation to the casing.

2. The brake device as claimed in claim 1, wherein the stop disk has a stop plane which is orthogonal with respect to the center axis and against which the cylinder piston bears in its non-actuated initial position, wherein the core has multiple elevations which are extended forward axially in the actuation direction as far as the stop plane and which are arranged spaced apart from one another in the circumferential direction.

3. The brake device as claimed in claim 2, wherein the elevations form flat plateaus, the axial end surfaces of which are arranged in the stop plane.

4. The brake device as claimed in claim 2, wherein the casing has, between two adjacent elevations in the circumferential direction, at least one protuberance which is arranged between two elevations in the circumferential direction and which is extended forward above the stop plane in the actuation direction.

5. The brake device as claimed in claim 4, wherein the casing has at least one depression which is formed below the stop plane in the actuation direction and which is arranged directly adjacent to at least one protuberance.

6. The brake device as claimed in claim 4, wherein the protuberance is in the form of a rib which is formed in a face side of the stop disk so as to extend between a radial inner dimension and a radial outer dimension.

7. A brake device for a hydraulic motor vehicle brake system without vacuum booster, comprising:
- a housing with at least one cylinder bore in which a cylinder piston is guided so as to be linearly displaceable along a center axis in an actuation direction and in a release direction directed oppositely to the actuation direction; and
- a stop disk which delimits movement of the cylinder piston in the release direction and thus defines a non-actuated initial position of said cylinder piston,
- wherein the stop disk is elastically reversibly compressible in an axial direction over a defined compression travel and delimits the compression travel, said delimitation being defined in a travel-controlled manner, and
- wherein the casing has multiple radial projections which are distributed uniformly in the circumferential direction and are extended forward in the radial direction beyond a radial outer side of the stop disk and so as to be larger than a diameter of the cylinder bore.

8. The brake device as claimed in claim 1, wherein the stop disk is of substantially plane-symmetrical construction in relation to a central plane which is orthogonal with respect to the center axis.

9. The brake device as claimed in claim 1, wherein the housing has at least one support projection which projects radially inward into the cylinder bore and on which the stop disk is supported in the release direction.

* * * * *